Patented May 27, 1941

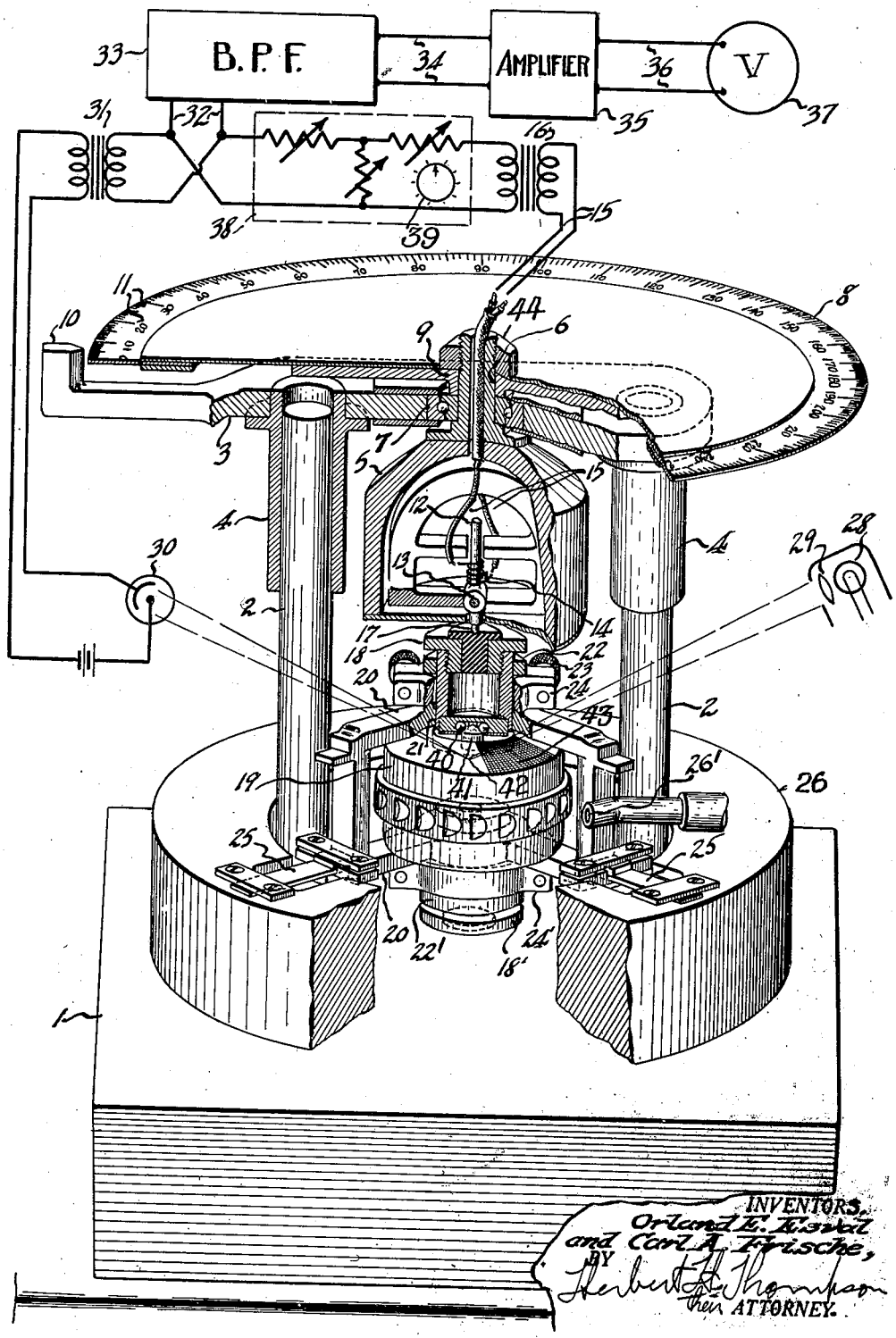

2,243,457

UNITED STATES PATENT OFFICE 2,243,457

METHOD AND APPARATUS FOR BALANCING ROTORS

Orland E. Esval, Summit, and Carl A. Frische, Leonia, N. J., assignors to Sperry Gyroscope Company, Inc., Brooklyn, N. Y., a corporation of New York Application July 18, 1936, Serial No. 91,444

20 Claims. (Cl. 73—53)

This invention relates, generally, to the balancing of rotors and the invention has reference, more particularly, to a novel apparatus for automatically dynamically balancing gyroscope rotors, flywheels, etc.

Heretofore, various methods have been employed for dynamically balancing rotors, ranging from the quartering cut and try method to the use of microscope and flashing stroboscope. However, none of the methods heretofore used have been very accurate and their use is limited to rotors operating at fairly low speeds. In the course of developing high speed, electrically driven gyros, considerable difficulty has been encountered in endeavoring to obtain good rotor balance. Since such high speed gyro rotors operate at speeds of 30,000 R. P. M. or more, the regular production methods of balancing have failed, experienced operators being unable to "feel" unbalance in rotors operating at such high speeds. Balancing the rotors at lower speeds is not satisfactory, since a dynamic balance obtained at a reduced speed, such as 10,000 R. P. M., for example, does not hold for a speed of 30,000 R. P. M., a certain degree of unbalance which would be tolerated at a speed of 10,000 R. P. M. becoming prohibitive at 30,000 R. P. M. Also, apparently the effect of non-symmetrical elastic deformation at the high stresses involved causes a rotor which is perfectly balanced at lower speeds to become unbalanced at high speeds.

The principal object of the present invention is to provide a novel method and apparatus for dynamically balancing rotors, which serves to quickly, accurately and substantially automatically indicate the location and magnitude of any unbalanced weight, thereby enabling the ready balancing of rotors by removing such indicated unbalanced weight.

Another object of the present invention lies in the provision of a novel method and apparatus of the above character wherein means is provided for phasing the voltage output of an electromagnetic pick-up connected to the rotor bearing or casing against a reference frequency voltage that is synchronous in phase with the rotor, the angular position of the electromagnetic pick-up serving to determine the angular position of the unbalanced weight, and the magnitude of the electromagnetic pick-up voltage output serving to determine the magnitude of the unbalanced weight.

Other objects and advantages will become apparent from the specification, taken in connection with the accompanying drawing, wherein one embodiment of the invention is illustrated.

In the drawing, the single figure is a part diagrammatic and part perspective view, with parts broken away, of the novel apparatus of this invention.

The underlying theory of automatic balancing is based on the fact that, assuming a fixed rotor speed, the rotating deflection of the rotor shaft, rotor casing, etc., has a fixed phase relation to the disturbing force or weight, the deflection being apparent as vibration. The motion resulting at each end of the rotor from dynamic unbalance of the rotor is approximately circular in a plane perpendicular to the rotor shaft. Thus, a particle on an end of the rotor axis moves in a circular path and has a definite phase or angular relation to the unbalanced weight on the rotor, so that should the dynamic unbalance of one end of the rotor be advanced by a certain angle, the particle on the gyro axis will be correspondingly advanced by the same angle in its circular path.

Two indications are necessary in dynamically balancing an end of a rotor, one indication being the magnitude and the other the position of the unbalanced weight. The circular motion of the particle on the rotor axis provides the information which may be used to give both the position and magnitude of the unbalanced weight. At a given speed, the magnitude of the unbalance is directly proportional to the amplitude, i. e., diameter of the circular path in which the particle is moving.

According to the principles of the present invention, an electromagnetic vibration instrument, such as a phonograph pick-up, is employed which is responsive to relative oscillation of the rotor spin axis, which of course is imparted to the rotor bearing support. To this end, said instrument is applied or coupled in some manner to the rotor axis at an end of the rotor, to generate a voltage proportional to the amplitude at a definite frequency. It follows, therefore, that such generated voltage is proportional to the moment of the unbalanced rotor weight. A voltmeter connected to the output of the pick-up therefore will indicate directly the degree of dynamic unbalance.

Since the electromagnetic pick-up coil is sensitive to vibration in only one plane, it generates voltage as though the motion of the particle were vibrating across the diameter of its circular path. The pick-up can obviously be positioned to generate voltage along any diameter of this circular path and the value of the voltage output of all positions is the same. The phase relation between voltages is, however, affected directly by the angular position of the pick-up, so that as the pick-up is turned angularly about its axis, i. e., about the rotor axis, the phase of the output voltage of the pick-up is correspondingly varied. This property of change in phase with change in angular position of the pick-up is used to provide the necessary information for determining the position of the unbalanced weight, since, as previously pointed out, the motion of the particle on the rotor axis also has a definite phase relation to the position of the rotor unbalance.

A reference frequency voltage is necessary and must be synchronous and fixed in phase with the rotor. When balancing synchronous motors and rotors driven therefrom, the supply frequency will do under constant conditions of load and supply voltage. For other machines, means such as a contact, a magnet or a photocell may be used to supply the reference voltage. When balancing gyro rotors, and especially air driven gyro rotors, a photocell is preferred for supplying the reference voltage, the signal voltage from the photocell being obtained by reflecting a beam of light from the surface of the spinning rotor having a dark spot thereon, whereby the reflecting coefficient of such spot is low as compared to the remainder of the gyro rotor surface reflecting the beam. Thus, the output of the photocell is caused to change cyclically at rotor frequency, which is also the output frequency of the electromagnetic pick-up.

In carrying out the method of the present invention, the output voltage of the electromagnetic pick-up is phased against the output voltage of the photocell by applying these voltages to a meter or other potential responsive device. The phase of the pick-up coil output can be adjusted by changing the angular position of the pick-up, whereby the same is made to buck or boost the photocell output so that the meter or other potential responsive device will show when the phase angle between the two outputs is either zero or 180°. The angular position of the pick-up to give this phase relation serves to determine the angular position of the unbalanced weight with respect to the non-reflecting black spot of the rotor, whereas the magnitude of the pick-up output is a measure of the magnitude of the unbalanced weight, so that with both factors being known, i. e., position and magnitude of the unbalanced weight, the rotor can be readily balanced by removing the indicated amount of material from the proper spot on the rotor.

In the drawing, the reference numeral 1 designates a suitable support, such as a bench or table, to which posts 2 are secured to extend upwardly therefrom. A frame 3 is provided with depending hollow bosses 4 that are mounted upon the posts 2 and are vertically adjustable along these posts, whereby the frame 3 may be raised and lowered at will. An electromagnetic pick-up 5 has an upwardly extending stem 6 that projects through a bearing 7 provided in frame 3. An indicator disc 8 has its hub portion 9 fixed upon stem 6, which hub portion, by engaging the upper surface of bearing 7, serves to support pick-up 5 upon the frame 3, while the bearing 7 enables the angular turning of disc 8 and the connected electromagnetic pick-up 5. A stationary reference pointer 10 is carried by frame 3 for cooperation with indicia, such as degree marks 11 provided on the disc 8.

The armature 12 of pick-up 5 is shown pivoted on a transverse pin 13 and is provided with a winding 14 that is connected by leads 15 extending through a central aperture in stem 6 to the primary of a transformer 16. The lower end portion of armature 12 is preferably pointed at 17 for engaging a slight depression provided in the top of an upper rotor bearing housing 18, which depression preferably is on the vertical rotating axis of the rotor 19 to be balanced. With the pointed end 17 of armature 12 engaged in a depression of rotor bearing housing 18, the pick-up 5 is suitably coupled to housing 18, whereby the circular vibrating portion of this housing serves to operate the electromagnetic pick-up. Rotor 19 is illustrated as a gyro rotor, but it is to be understood that any type of rotor or rotating means may be balanced by the method and means of this invention.

Upper rotor bearing housing 18 is adapted to be retained within the hollow interior 21 of an upper cylindrical portion 22 provided on a symmetrical spider frame 20 by means of a C-clamp 24 projecting into a transverse slot provided in the cylindrical portion 22 and attached to this portion as by screws 23. The lower rotor bearing housing 18' is similarly retained in a lower cylindrical portion 22' of spider frame 20 by a C-clamp 24'. The lower part of spider frame 20 is rigidly attached at three points spaced approximately 120° apart, to the inner ends of leaf springs 25 that extend radially outwardly and have their outer ends rigidly attached to an annular base member 26. Springs 25 provide a three point support for spider 20 and since these springs are substantially on a level with the lower bearing housing 18', they greatly restrict or substantially eliminate vibration of this bearing housing while allowing substantially free vibration of the upper bearing housing 18.

A lamp 28 is employed in conjunction with lens means 29 for directing a beam of light upon the upper surface of rotor 19, the reflected beam being applied to a photocell 30 having its output connected to the primary of a transformer 31. The secondary of transformer 31 is connected through leads 32 to a band pass filter 33, the output of which is connected by leads 34 to a suitable linear thermionic amplifier 35 of any well known type. The output of amplifier 35 is applied by leads 36 to a voltmeter 37 or other potential responsive device. The transformer 16, energized from the pick-up 5, is connected through an attenuator 38 to leads 32 to be supplied to the band pass filter 33. By adjusting the knob 39 of the attenuator 38, the effective resistance of the attenuator is varied and hence the magnitude of the voltage supplied from pick-up 5 through transformer 16 to the band pass filter 33 may be reduced as much as desired.

In use, each rotor being tested is provided with a substantially non-reflecting or black spot 43 of definite size, i. e., all rotors of the same size are provided with identical black spots 43, the remainder of the surface of each rotor engaged by the light beam being uniformly polished. The pick-up 5 and indicator disc 8 are initially so set angularly with respect to the light spot 42 (i. e., the point at which the light beam strikes the rotor 19), that when the unbalanced weight of the upper end of the rotor coincides with the angular center of the rotor black spot 43, the zero reading of the scale 11 will coincide with pointer 10.

This initial setting of the indicator disc 8 may be accomplished by placing a weight on the center of the black spot 43 and, with the rotor up to speed, then turning pick-up 5 so that meter 37 reads zero, the knob 39 of the attenuator being previously set, if necessary, so that the magnitude of the voltage supplied from the pick-up 5 is the same as that supplied from photocell 30. This initial setting of knob 39 is readily accomplished by first reading meter 37 with lamp 28 turned on but with the knob 39 turned so as to cut off the pick-up voltage, whereupon the lamp 28 is turned off and the knob 39 adjusted so that meter 37 reads as before, showing that the outputs of the photocell and the pick-up as supplied through the attenuator are the same.

With pick-up 5 thusly positioned so that meter 37 reads zero when an unbalanced weight is on the center of black spot 43, the disc 8 is adjusted angularly with respect to the pick-up 5 as by loosening nut 44 so that the zero mark on scale 11 is made to coincide with the pointer 10, whereupon nut 44 is tightened. The apparatus is now set for testing rotors.

To insert a rotor 19 into the apparatus for balancing, the clamp screws 23 at the upper and lower spider frame hub portions 22 and 22' are loosened and the bearing housing 18 and 18' raised and lowered somewhat, respectively, so as to admit the rotor trunnions therebetween, whereupon the bearing housings are moved toward each other so that anti-friction bearings 40 carried by housings 18 and 18' engage the upper and lower trunnions 41 of rotor 19. The clamp screws 23 are then tightened again, thereby securing the bearing housings 18 and 18' in place. The rotor 19 is now brought up to desired speed as by use of air nozzle 26'.

In order to determine the magnitude of the unbalanced weight, the lamp 28 is turned off and the meter 37 read. This meter may be calibrated directly in grains or other suitable weight units, if desired. In order to locate the position of the unbalanced weight, the knob 39 is adjusted so that the output of the pick-up 5 is the same as the known output of the photocell 30, at which time the setting of knob 39 is another measure of the magnitude of the unbalanced weight. Then the lamp 28 is turned on and the disc 8 turned until meter 37 indicates zero, showing that the pick-up voltage output is just 180° out of phase with the photocell output. The reading of scale 11 with respect to pointer 10, measured in the direction of rotation of rotor 19, will give the angular position of the unbalanced weight measured in the same direction with respect to the angular center of the black spot 43. This must be true since with the unbalanced weight on the center of the dead spot, the scale 11 is set to read zero. Since the magnitude and location of the unbalanced weight are now known, the rotor may be removed and a hole drilled at the indicated position and to the indicated depth to remove the desired amount of material. The rotor is then turned upside down and again inserted into the apparatus for balancing the other end of the rotor.

There are other causes besides rotor unbalance that set up vibrations, but these vibrations occur at different frequencies from the fundamental rotor frequency. Thus, bearings, windage and magnetic noises set up vibrations affecting the electromagnetic pick-up so that this pick-up has additional outputs occurring, however, at different frequencies from the fundamental rotor frequency, and in order that these additional frequency outputs shall not affect the reading of meter 37, it is necessary to employ the band pass filter 33. Filter 33 preferably should have a band not exceeding twenty cycles wide and should be adjustable over the range of speeds in which balancing is to be done. Amplifier 35 provides sufficient gain so that the power level is sufficiently high to read on meter 37.

In practice, the novel balancing method of this invention has been found to be very successful, practical and exceedingly accurate, it being the only successful method known for balancing high speed rotors operating as high as 30,000 R. P. M. or higher, while its use for balancing rotors operating at lower speeds not only gives far more accurate results than methods heretofore used, but also reduces the time necessary to balance rotors to but a fraction of the time heretofore generally consumed and, in addition, eliminates the necessity of using skilled operators.

The amplifier 35, being a linear amplifier, gives a voltage proportional to the velocity of the pick-up needle, since the output voltage of the pick-up 5 is proportional to velocity. However, should it be desired to provide a voltage output from the amplifier proportional to the amplitude of displacement of the pick-up needle instead of the velocity thereof, then in such case an integrating amplifier would be substituted for the amplifier 35. This integrating amplifier would serve to integrate or add up the voltage output of the pick-up in such a way as to supply the meter 37 with a voltage dependent upon the amplitude of displacement of the pick-up needle which, in turn, is a function of the rotor unbalance.

Also, in some instances it is desired to know the forces acting upon the rotor bearings due to rotor unbalance and since these forces are proportional to acceleration of the unbalanced mass of the rotor, by employing a differentiating type amplifier instead of the amplifier 35, then the velocity type signal voltage received by this amplifier from the pick-up is converted into an acceleration or second derivative with respect to time voltage of the pick-up needle displacement.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. In an apparatus for balancing rotors, means for receiving and supporting a rotor, means for rotating the rotor, means for supplying an alternating E. M. F. of a frequency corresponding to the speed of the rotor, adjustable electromagnetic pick up means operated from said rotor supporting means to produce an alternating E. M. F. responsive to the unbalance of the rotor, means for suppressing E. M. F.'s not of substantially rotor frequency and indicating means arranged to be controlled in response to said combined rotor speed and unbalance E. M. F.'s.

2. In an apparatus for balancing rotors, means for receiving and supporting a rotor, means for rotating the rotor, means for supplying an alternating E. M. F. of a frequency corresponding to the speed of the rotor, said supply means comprising a photocell activated by a beam of light reflected from the rotor having a spot thereon, electromagnetic means for coupling to said rotor supporting means to produce an alternating E. M. F. responsive to the unbalance of the rotor, and indicating means arranged to be controlled in response to said E. M. F.'s.

3. In an apparatus for balancing rotors, means for receiving and supporting a rotor, means for rotating the rotor, means for supplying an alternating E. M. F. of a frequency corresponding to the speed of the rotor, said supply means comprising a photocell activated by the beam of light reflected from the rotor having a spot thereon, electrical pick-off means responsive to unbalance of the rotor for producing an alternating E. M. F., and indicating means arranged to be controlled in response to said E. M. F.'s, said electromagnetic means being turnable to vary the phase of the alternating E. M. F. output thereof, whereby its output may be used to oppose the output of said photocell.

4. In an apparatus for balancing rotors, comprising means for rotatably supporting a rotor, an electrical pick-up operated from said means adjacent an end of the rotor to produce an alternating E. M. F. responsive to the rotor unbalance, said pick-up being turnable about the axis of the rotor to vary the phase of the output of said pick-up, luminously excited means for supplying an alternating E. M. F. synchronous with the speed of the rotor, a filter for receiving said alternating E. M. F.'s, and an indicator operable in response to the output of said filter.

5. In an apparatus for balancing rotors, comprising means for rotatably supporting a rotor having surface portions of differing light reflecting capacities, an electromagnetic pick-up for cooperating with said means adjacent an end of the rotor to produce an alternating E. M. F. responsive to the rotor unbalance, said pick-up being turnable about the axis of the rotor to vary the phase of the output of said pick-up, an angle indicator connected to said pick-up to show the angular position of the same, means comprising a photocell activated by a beam of light reflected from said rotor for producing an alternating E. M. F. for comparison with the output of said pick-up, a filter electrically connected for receiving said alternating E. M. F.'s, and an indicator operable in response to the output of said filter.

6. In an apparatus for balancing rotors, comprising means for rotatably supporting the rotor, an electromagnetic pick-up for coupling to said means adjacent an end of the rotor to produce an alternating E. M. F. responsive to the rotor unbance, said pick-up being turnable about the axis of said rotor to vary the phase of the output of said pick-up, an angle indicator connected to said pick-up to show the angular position of the same, means comprising a photocell activated by a beam of light reflected from the rotor for producing an alternating E. M. F. for comparison with the output of said pick-up, a filter electrically connected for receiving said alternating E. M. F.'s, an indicator operable in response to the output of said filter, and an attenuator included in the connection between said pick-up and said filter for reducing the magnitude of the voltage output of said pick-up to substantially that of said photocell, whereby the turning of said pick-up may be caused to effect a zero indication of said indicator.

7. In an apparatus for balancing rotors, comprising means for rotatably supporting the rotor having surface portions of differing light reflecting capacities, an electromagnetic pick-up for coupling to said means adjacent an end of the rotor to produce an alternating E. M. F. responsive to the rotor unbalance, said pick-up being turnable about the axis of the rotor to vary the phase of the output of said pick-up, an angle indicator connected to said pick-up to show the angular position of the same, means comprising a photocell activated by a beam of light reflected from the rotor for producing an alternating E. M. F. for comparison with the output of said pick-up, a band pass filter electrically connected to said pick-up and to said photocell means for receiving said alternating E. M. F.'s, an amplifier connected to the ouput of said filter, and a voltage indicator supplied from said amplifier.

8. An apparatus for balancing rotors, comprising a frame member providing bearing means for rotatably supporting a rotor to be tested, means for supplying an alternating potential synchronous with the rotor operation, an electromagnetic pick-up arranged to be coupled to said bearing means, a variable attenuation network for adjusting the output of said pick-up, filter means electrically connected to said alternating potential supply means and to said pick-up for receiving potentials from these sources and suppressing all but rotor frequency potentials, and indicating means responsive to the output of said filter.

9. The method of balancing rotors, comprising producing an alternating E. M. F. having a frequency responsive to the speed of rotation of the rotor being balanced, producing a second alternating E. M. F. having a frequency responsive to the speed of rotation of said rotor and a magnitude dependent upon the amplitude of motion of a particle on the rotor axis, the position of which particle at any moment has a definite phase relation to the unbalanced rotor weight, serially combining said alternating E. M. F.'s, filtering the resulting E. M. F. to remove substantially all components not of rotor frequency and amplifying the substantially single frequency E. M. F., applying the same to a voltage indicator, and then varying the phase of one of said alternating E. M. F.'s to reduce the reading of said indicator to a predetermined value, the relative phase shift of said alternating E. M. F.'s serving as an indication of the location of the unbalanced rotor weight.

10. An apparatus for balancing rotors, comprising means for supplying an alternating E. M. F. having a frequency responsive to the speed of rotation of the rotor being balanced, voltage generating means responsive to motion in a single plane of an end of the rotor on the axis thereof for producing an alternating E. M. F. of the same frequency as said first E. M. F., said second E. M. F. being responsive to the amplitude of motion of the rotor end, means for modifying one of said E. M. F.'s so that both are of substantially the same magnitude, filter means connected for receiving said E. M. F.'s and serving to eliminate voltages of different frequency, an amplifier for receiving the output of said filter means, and an indicator supplied from said amplifier.

11. An apparatus for balancing rotors, comprising means for supplying an alternating E. M. F. having a frequency responsive to the speed of rotation of the rotor being balanced, voltage generating means responsive to motion in a single plane of an end of the rotor on the axis thereof for producing an alternating E. M. F. of the same frequency as said first E. M. F., said second E. M. F. being responsive to the amplitude of motion of the rotor end, means for modifying one of said E. M. F.'s so that both are substantially the same magnitude, filter means connected for receiving said E. M. F.'s and serving to eliminate voltages of different frequency, an amplifier for receiving the output of said filter means, an indicator supplied from said amplifier, said voltage generating means being angularly turnable to vary the phase of the output thereof, and angle indicating means for showing the extent of turning of said voltage generating means when said second E. M. F. is displaced 180° with respect to said first E. M. F.

12. In an apparatus for balancing rotors, means for rotatably supporting the rotor, an electromagnetic pick-up having a stem for contacting said means adjacent the end of the rotor to produce an alternating E. M. F. dependent on the velocity of movement of said stem, said pick-up being turnable to vary the phase of the output thereof, an indicator, and a linear amplifier arranged for receiving the variable phase alternating E. M. F. output of said pick-up and for supplying an amplified version thereof to said indicator.

13. In an apparatus for balancing rotors, means for rotatably supporting the rotor, an electromagnetic pick-up having a stem coupled to said means adjacent the end of the rotor to produce an alternating E. M. F. dependent on the velocity of movement of said stem, said pick-up being turnable to vary the phase of the output thereof, an indicator, and an integrating amplifier arranged for receiving said alternating E. M. F., said amplifier acting to supply an alternating E. M. F. to said indicator proportional to the amplitude of displacement of said stem.

14. In an apparatus for balancing rotors, bearing means for rotatably supporting the rotor, an electromagnetic pick-up having a stem coupled to said bearing means adjacent the end of the rotor to produce an alternating E. M. F. dependent on the velocity of movement of said stem, said pick-up being turnable with respect to said bearing means to change the phase thereof at will, an indicator, and a differentiating amplifier arranged for receiving said velocity type alternating E. M. F. of variable phase, said amplifier serving to convert said E. M. F. to an acceleration type E. M. F. for controlling said indicator.

15. In an apparatus for balancing spinning rotors, the combination with a rotor bearing support, a photo-electric device for generating from the rotation of the rotor an E. M. F. of rotor speed frequency, an electrical pick-up device mounted adjacent said support and responsive to vibrations thereof to produce a second E. M. F. of like frequency, and an angularly adjustable mounting for one of said devices to permit matching the phases of said two E. M. F.'s, whereby the angular position of unbalance is indicated.

16. In an apparatus for balancing spinning rotors, the combination with a rotor bearing support, a photo-electric device for generating from the rotation of the rotor an E. M. F. of rotor speed frequency, an electrical pick-up device mounted adjacent said support and responsive to vibrations thereof to produce a second E. M. F. of like frequency, an angularly adjustable mounting for one of said devices to permit matching the phases of said two E. M. F.'s, and angular indications associated with said mounting, whereby the angular position of unbalance is indicated.

17. In an apparatus for balancing spinning rotors having a surface divided into a plurality of sections of non-uniform light reflecting characteristics, resilient means for rotatably supporting a rotor, an electromagnetic pick-up coupled to said means adjacent an end of the rotor to produce an alternating E. M. F. responsive to rotor unbalance, means for generating a second alternating E. M. F. synchronous with the rotor speed comprising means for projecting light on said rotor surface and a photo cell actuated by light reflected from said surface, means for combining said E. M. F.'s, a filter receiving said combined E. M. F.'s and acting to eliminate harmonics, and an indicator operable in response to the output of said filter.

18. The method of balancing a rotor having a surface divided into two sections of different light reflecting properties, comprising clamping one end only of the rotor shaft against lateral vibrations whereby a point adjacent said end is substantially restrained against vibration, and a symmetrically placed point adjacent the other end of said shaft is allowed to vibrate, generating an alternating E. M. F. proportional to the vibration of said second point, generating a second alternating E. M. F. of frequency corresponding to the rotor speed by reflecting a beam of light from the sectioned surface of the rotor to a photo cell, combining said E. M. F.'s and adjusting the relative phase and amplitude thereof to produce an indication of the magnitude and phase of the rotor unbalance.

19. In apparatus for balancing rotating bodies, means for receiving and supporting a rotatable body, means for rotating said body, means for generating an E. M. F. in response to unbalance of said body, means for generating an E. M. F. of a frequency corresponding to the speed of rotation of said body including a luminous source, a member having a marked surface rotating synchronously with said body and a photo-electric cell for receiving light from said source after reflection from said surface, and means for combining said two E. M. F.'s to determine the magnitude and phase of said unbalance.

20. In apparatus for balancing a spinning rotor having a surface divided into a plurality of sections of non-uniform light reflecting characteristics, a light source, a photo-electric cell, means for directing a beam of light from said source onto said cell after reflection from said surface, means for obtaining a substantially sinusoidal E. M. F. from the output of said cell, means for detecting unbalance of said rotor and means for utilizing said E. M. F. to determine the magnitude and phase of the unbalance.

ORLAND E. ESVAL.
CARL A. FRISCHE.